April 3, 1951        B. B. JACOBSEN        2,547,011

ELECTRIC FAULT ALARM CIRCUITS

Filed May 14, 1947                              4 Sheets-Sheet 1

Inventor
Bent Bülow Jacobsen
By
Robert Harding Jr.
Attorney

April 3, 1951  B. B. JACOBSEN  2,547,011
ELECTRIC FAULT ALARM CIRCUITS
Filed May 14, 1947  4 Sheets-Sheet 3
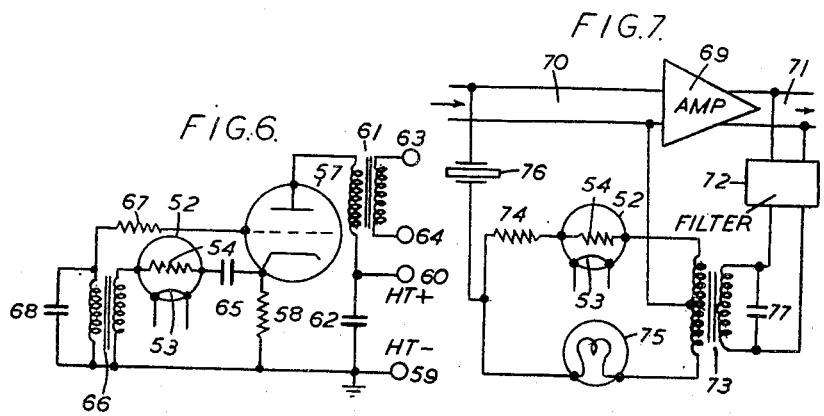
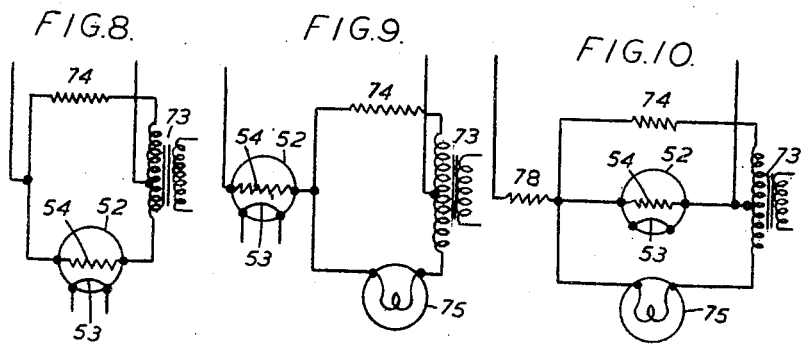
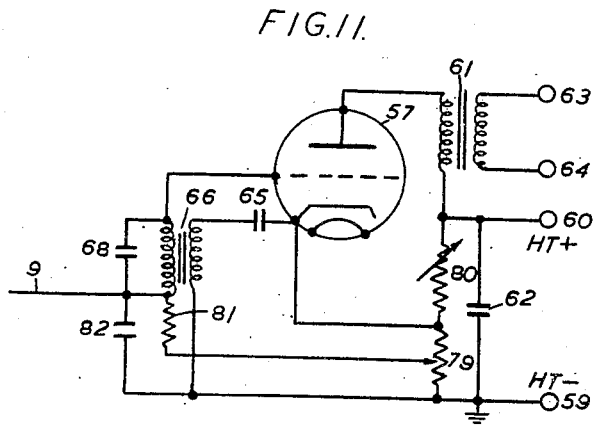
Inventor
Bent Balun Jacobsen
By
Robert Harding Jr.
Attorney

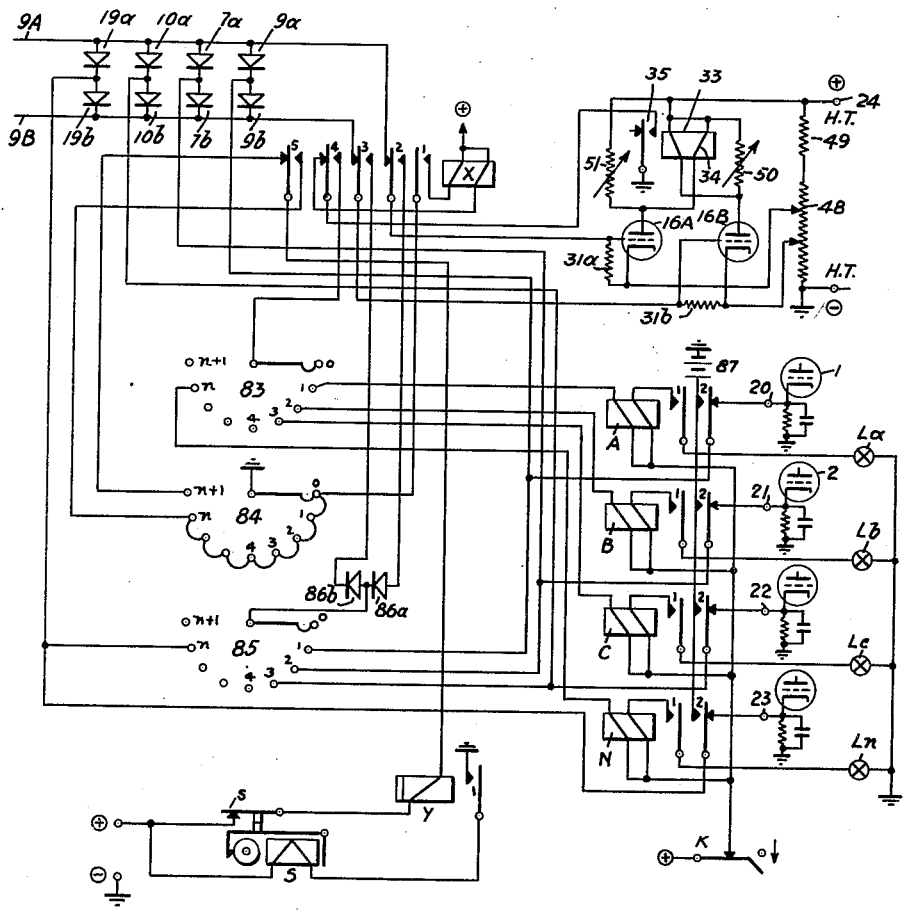

Patented Apr. 3, 1951

2,547,011

UNITED STATES PATENT OFFICE 2,547,011

ELECTRIC FAULT ALARM CIRCUITS

Bent Bulow Jacobsen, London, England, assignor to International Standard Electric Corporation, New York, N. Y., a corporation of Delaware Application May 14, 1947, Serial No. 747,893
In Great Britain May 21, 1946

9 Claims. (Cl. 177—311)

The present invention relates to improvements in electric alarm circuits, and is particularly concerned with a circuit arrangement adapted to give an appropriate signal to indicate the failure or incipient failure of a thermionic valve in an amplifier or other like device, or to indicate a fault in the associated circuit.

It is now becoming a common practice to provide electrical communication circuits with amplifiers or other like apparatus installed at unattended stations, and it is therefore very necessary to provide arrangements for signalling a valve failure or other fault to a control station in order that the fault may be cleared with the minimum of delay. It is also desirable that means should be provided so that the particular valve which is affected may be located with certainty and with the minimum of delay by the operator who is to clear the fault. The arrangement should preferably require not more than one signalling circuit to the control station.

It is the principal object of the present invention to provide an arrangement which satisfies these requirements.

This object is achieved according to the invention by providing an arrangement for indicating the failure or incipient failure of any one of a plurality of electric devices comprising means for applying a potential derived from each of the said devices through a corresponding one of a plurality of rectifiers to a common test conductor, and fault detecting means connected to the said common test conductor, and adapted to transmit a fault indicating signal when the potential derived from one of the said electric devices varies outside a predetermined limit, the arrangements being such that in this condition the rectifiers corresponding to all the other devices are blocked.

The invention will be described with reference to the accompanying drawings in which:

Fig. 3 shows a simplified diagram of a modification of Fig. 2;

Figs. 4 and 5 show diagrams to illustrate the use of a thermistor in the arrangement of Fig. 1;

Fig. 6 shows a schematic circuit diagram to illustrate the manner in which a thermistor may be applied to control an oscillation generator for transmitting the fault indication signal;

Fig. 7 shows a schematic circuit diagram to illustrate the manner in which a thermistor can be applied to control oscillations generated by a line amplifier for transmitting the fault indicating signal;

Figs. 8, 9 and 10 show minor modifications of Fig. 7; and

Fig. 11 shows a schematic circuit diagram of an oscillation generator which may be used in Fig. 1 to transmit the fault indicating signal without the use of a controlling thermistor; and Fig. 12 shows a modification of Fig. 3 illustrating an arrangement for automatically selecting a faulty device.

Figure 1:
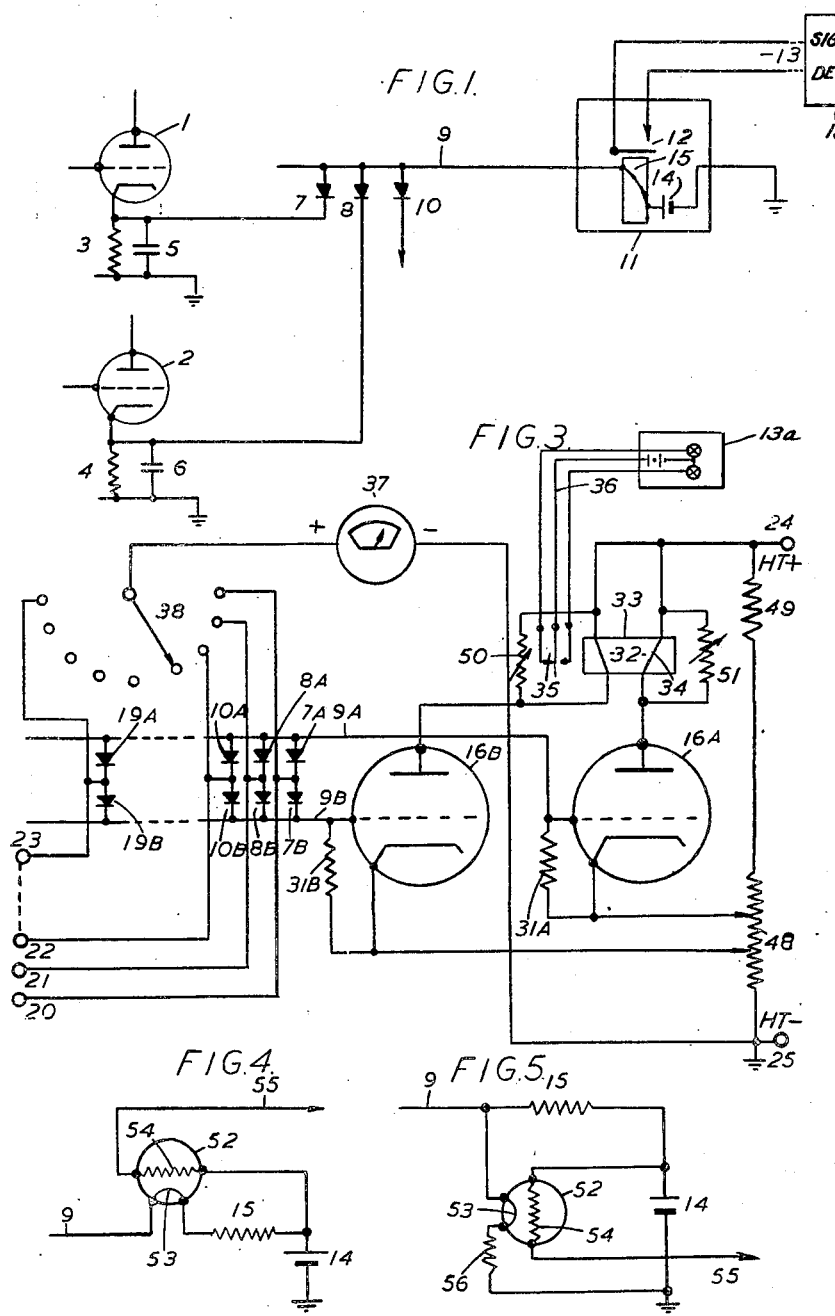
Fig. 1 shows a schematic circuit diagram to illustrate the principles of the invention.

The principles of the invention will be understood from Fig. 1, which illustrates one particular application of the invention. It will be assumed that it is desired to indicate the failure of any one of a number of valves in amplifiers or other apparatus at a given station. Two only of such valves are shown at 1 and 2, but details of the associated circuits, except as regards the invention, are not given.

The valves 1 and 2 have connected between the cathodes and earth, resistances 3 and 4 which may be shunted by by-pass condensers 5 and 6. Other apparatus (not shown) may be included in series with the cathodes, or may be associated therewith, but it is preferable to arrange so that one end of each of the resistances 3 and 4 is connected to ground or other point of fixed potential. All other valves (not shown) in the station may be equipped with such resistances and condensers in the same way.

The resistances 3 and 4 should be so chosen or adjusted that the potential drop across each one falls below a certain specified failure potential when the corresponding cathode current has become reduced for any reason below the lowest value for satisfactory operation of the valve. The specified failure potential might, for example, be 4 volts. The potential drop across the resistance 3 or 4 at any time will be called the "test potential."

The cathodes of the valves 1 and 2 are connected by rectifiers 7 and 8 to a common test conductor 9. The cathodes of all the other valves in the station which are to be supervised are likewise connected to conductor 9 by individual rectifiers, of which one only is shown at 10. All these rectifiers have their anodes connected to the conductor 9, and this conductor is connected to a fault detecting device 11 which is adapted to give a signal when one of the valves fails, for example by closing a pair of contacts 12 connected to a circuit 13 leading to a signal device 13A at the same or at some other station.

The device 11 should preferably include a source of positive potential which is applied through a resistance to the conductor 9, as indicated diagrammatically at 14 and 15. Resistance 15, for example may be the winding of a relay cooperating with contacts 12. It will be understood that this source may be provided in any suitable way.

The potential of the source 14 should be fixed at some suitable reference value, which may be a little higher than the specified failure potential, (such for example as 5 volts), though this is not essential so long as it is fixed.

The potential of the conductor 9 will be determined by the valve having the lowest test potential, when such test potential is below that of the source 14. If, for example, the valve 2 is the said valve then the retifier 8 will be unblocked and current will flow from the source 14 through the resistance 4 to ground, the potential of the conductor 9 falling below the potential of source 14 by an amount determined by the resistance 4 and 15. Thus all the other rectifiers will be blocked since the corresponding valve cathodes will be at a higher potential than the conductor 9, and no appreciable currents will flow from conductor 9 to these cathodes.

It is, of course, not desired that any signal should be given while the valve 2 is operating normally, and the device 11 will accordingly be so adjusted that the signal is given only when the test potential of the valve 2 or of any other valve falls below the specified failure potential. This can happen either by a falling off of the emission from the cathode as a result of normal ageing or of a defective cathode coating or the like, or by a circuit disconnection causing a sudden reduction or complete failure of the cathode current. It will be understood, of course, that the potential of the conductor 9 will always be determined by the cathode having the lowest test potential for the reasons explained above, so that if an abnormally low test potential occurs in some other valve, the corresponding rectifier will be immediately unblocked, and the rectifier 8 corresponding to the valve 2 will be blocked, and an alarm will be given.

It will be seen that although all the cathodes are connected to a common conductor 9, the failure of one of them does not affect the normal operation of the others, since as soon as the failure occurs, the other cathodes become effectively disconnected by the blocking of the corresponding rectifiers.

If the device 11 operates as a potential detector, the resistance of relay winding 15 should be large compared with the cathode resistances 3 and 4, in order that the potential of the common conductor 9 may be substantially the same as that of the cathode having the lowest potential. If, however, the device 11 operates as a power detector, resistance 15 should preferably be of the same order as resistances 3 and 4. The contacts 12 are normally closed and constitute with circuit 13 and signal device 13A a closed-loop alarm system of classic type.

The arrangement described so far will give a signal to indicate the failure of any valve connected to the common conductor 9, but additional means are required if it is desired to indicate which particular valve has failed. Such an arrangement is shown in Fig. 12 to be described below, but there will often be no necessity to give this particular indication automatically at the control station, since when the existence of a fault is known the unattended station must be visited to clear the fault, and a simple manually operated test arrangement can be used to pick out the defective valve. Such a simple arrangement will be described with reference to Fig. 2.

When it is desired merely to indicate serious fault conditions which result in a large change or complete disappearance of the cathode current of a valve, the resistances 3 and 4 can be fixed resistances each of which is designed in accordance with the known average performance of the type of valve with which it will be used, since the specified failure potential may be fixed with sufficient margin to cover the normal commercial variations of the valves. If however it is necessary for the operation of the equipment that the performance of the valves be controlled within individual limits, it may be necessary to make the resistances 3 and 4 variable, so that an individual adjustment of the initial test potential for each valve may be made at the time when it is put in.

It will be obvious that a fault might arise which would cause an abnormal increase in the cathode current of a valve. This would, of course, not be detected by the arrangement described since the corresponding rectifier would be blocked. However faults of this nature could evidently be detected by a similar arrangement in which all the rectifiers are reversed, in which case the potential of the conductor 9 would be determined by the cathode of highest potential. It follows that two common conductors similar to 9 could be provided respectively connected to all the cathodes by oppositely directed rectifiers, both conductors being arranged to operate the device 11 by some suitable means on the failure of a valve so that the fault signal is given.

It should be pointed out that the valves supervised by a given device such as 11 in Fig. 1 can be of various entirely different types or of the same type differently operated. All that is necessary is to choose each cathode resistance so that the specified failure potential is produced when the cathode current falls to the rejection value.

While it has been stated that a failure of a valve does not interfere with the operation of the other valves because all the other rectifiers are blocked, it is possible that when two or more valves all have low test potentials which are nearly equal, and if the bypass condensers 5 and 6 are not provided, the corresponding rectifiers may, if not actually unblocked, have resistances sufficiently low to produce appreciable coupling between the valves concerned, and such coupling may occur before the test potential of the valves has fallen to the specified failure potential. In order to remove the risk of this coupling, the conductor 9 may be connected to ground through a suitable by-pass condenser (not shown) and/or a suitable resistance (also not shown) may be connected in series between each of the cathodes and the corresponding rectifier.

The arrangements described with reference to Fig. 1 can be modified in various ways and may be used to indicate faults in electrical devices other than valves. It is only necessary that a characteristic test potential can be produced or obtained at a suitable test point in the device, which test potential is changed by a failure or incipient failure of the device by an amount which, when abnormal, gives an alarm signal. The test potential may be derived if necessary by rectification from an alternating voltage or current generated in the device. A simple example of a device to which the invention may be applied is an ordinary fuse, across which a change of potential will usually occur when it blows. The arrangement can therefore be applied to signal the blowing of any fuse at an unattended station, for example.

The device 11 may take a number of different forms, examples of which will be explained with reference to the other figures of the drawing.

Figure 2:
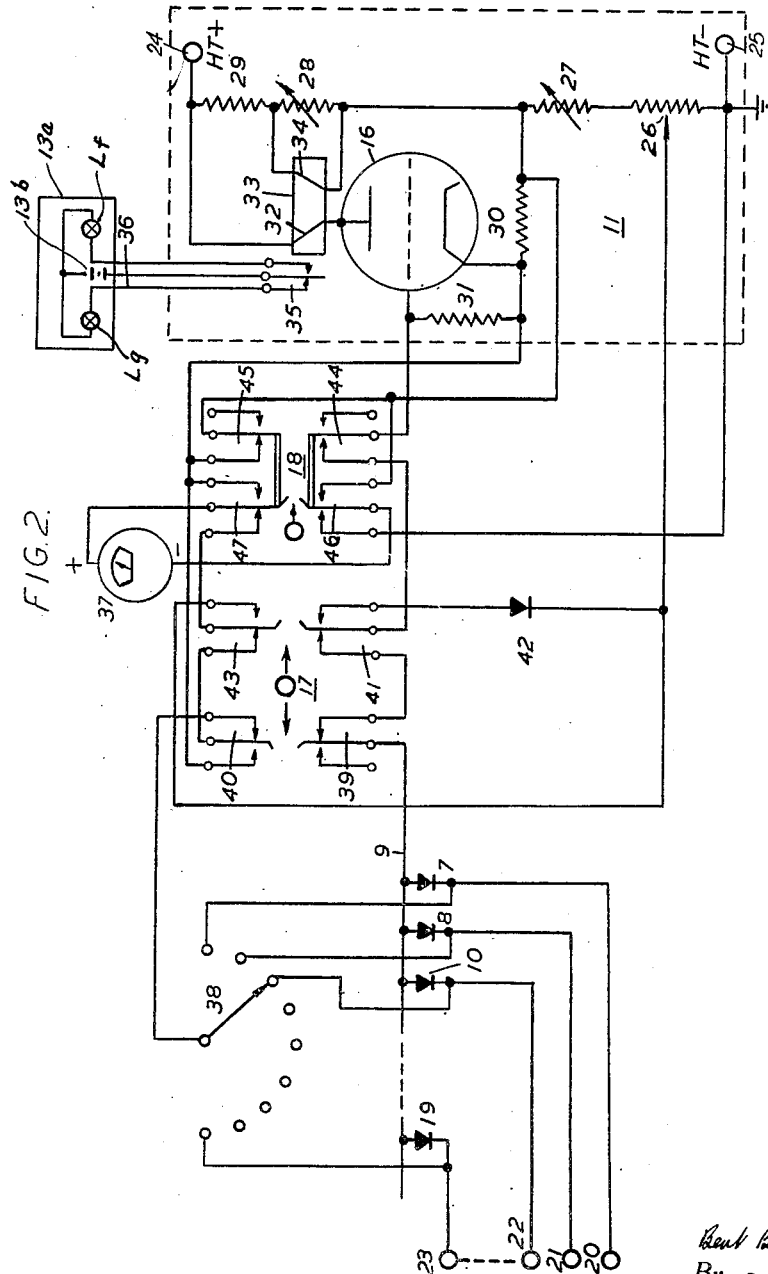
Fig. 2 shows a detailed schematic circuit diagram of a preferred embodiment.

Fig. 2 gives details of a preferred embodiment of the invention. The fault detecting device 11 includes a valve 16, which is shown as a triode for simplicity, but it will preferably be a pentode with the additional grids polarised in the usual way. The common conductor 9 is connected to the control grid of the valve 16 through the contacts of test keys 17 and 18 which will be described later. A number of rectifiers equal to the number of valves to be served by the alarm circuit will be connected to the common conductor 9. Four only are shown, numbered 7, 8, 10 and 19, and the cathodes of these rectifiers are connected to terminals 20, 21, 22 and 23 and thence to the corresponding test points, which in the case of Fig. 1 will be the cathodes of the valves, all of which will be arranged similarly to the valves 1 and 2.

The positive and negative terminals for the operating source for the valve 16 are 24 and 25, the latter being connected to ground. A chain of resistance elements consisting of a potentiometer 26, two adjustable resistances 27 and 28 and a fixed resistance 29 is connected between the terminals 24 and 25. The cathode of the valve 16 is connected to the junction point of the resistances 27 and 28 through a resistance 30 which is normally short-circuited by springs of the key 18. The control grid is connected to the cathode through a high resistance 31 which corresponds to the major part of the resistance 15 of Fig. 1. The anode of the valve 16 is connected to terminal 24 through one of the windings 32 of a relay 33. A second winding 34 of this relay is used as a bias winding and is connected across the variable resistance 28. The contacts 35 of the relay are connected to lines 36 which may run to the control station, or to any other desired point.

A voltmeter 37 of any suitable type has its negative terminal connected through springs of the key 18 to ground, and its positive terminal through springs of both keys to a selecting switch 38 having studs connected to the terminals 20 to 23 leading to the test points of the valves. It will be seen that when a faulty valve has been signalled, an operator can quickly pick it out by operating the switch 38 and noting when an abnormal reading is obtained on the voltmeter 37, which should read a value not less than the specified failure potential (4 volts) for all good valves.

The resistance chain should be so designed that the potential of the cathode of the valve 16 can be adjusted by means of the resistance 27 to the reference value (5 volts). Resistance 27 should preferably be small compared with the resistance of the potentiometer 26. Then when all supervised valves are normal, the control grid potential of the valve 16 with respect to the cathode will generally be small or zero. The anode current flows through the winding 32 of the relay 33 and the bias current flows in opposition through the winding 34 and should be adjusted by means of the resistance 28 so that the relay is not operated. As already explained, when the valve fails, the potential of the conductor 9, which is applied to the control grid of the valve 16, will be reduced below the specified failure potential, and this reduces the anode current of the valve. The resistance 28 should be adjusted so that the relay operates under this condition. The contacts 35 may then be arranged in any suitable way to control a signal current in the lines 36 which may operate a signal of any type at any desired point. It will be understood that the contacts 35 shown are only illustrative. One method of signalling is shown in Fig. 2 where signal device 13a contains a pair of signal lamps $L_f$ and $L_g$ connected in common to a potential source 13b and connected respectively to different of leads 36, whereby signal lamp $L_f$ renders an indication of failure due to the pull of winding 34 of relay 33, the front contacts of relay 33 closing a circuit for lamp $L_f$ via an obvious circuit. For normal operation lamp $L_g$ indicates normal operation, the anode current of tube 16 flows through winding 32 of relay 33 cancelling the pull of winding 34, causing the back contacts of relay 33 to complete a circuit for lamp $L_g$ via an obvious circuit.

The relay 33 should preferably be of a sensitive type such as a telegraph relay, or a voltmeter relay, and may be of the polarised type. If of the neutral type, it may be arranged to give the signal either by operating or by releasing when the anode current is reduced.

The switching keys 17 and 18 are provided to assist in testing and adjusting the alarm circuit. In order to adjust the circuit, the key 17 is first operated to the left-hand side. The conductor 9 is thereby disconnected from the valve 16 by the springs 39, and the positive terminal of the voltmeter 37 is removed from the switch 38 by the springs 40 and connected instead to the cathode of the valve 16. The resistance 30 being short-circuited by key 18, the voltmeter thus measures the potential across the resistances 26 and 27. Resistance 27 is accordingly adjusted until the voltmeter reads the specified reference voltage (5 volts). Next, the key 17 is operated to the right-hand side. Springs 41 then disconnect the control grid of the valve 16 from the common conductor 9, and connect it instead through a rectifier 42 to the movable contact of the potentiometer 26. At the same time springs 43 disconnect the positive terminal of the voltmeter 37 from the switch 38 and connect it instead to the contact of the resistance 26, which should be adjusted until the voltmeter reads the specified failure potential. Resistance 28 is now adjusted so that the relay 33 just operates.

It will be evident that if the valve 16 should fail, the relay 33 will also be operated owing to the disappearance of the anode current. In the event of an alarm signal being given, the valve 16 may be checked by operating the key 18. The springs 44 then disconnect the common conductor 9 from the control grid of the valve 16, and the springs 45 remove the short-circuit from the resistance 30 in series with the cathode. Springs 46 and 47 disconnect both terminals of the voltmeter 37 and connect it across the resistance 30, thus measuring the voltage drop produced by the cathode current in this resistance, whose value will be chosen so that a convenient reading (such as 5 volts) is obtained on the voltmeter when the valve is operating normally.

The rectifier 42 is only used when the alarm circuit is being adjusted, and should be similar to the other rectifiers. The arrangement simulates a fault condition as closely as possible to enable the circuit to be adjusted in the manner explained.

The rectifiers may be dry plate rectifiers of the selenium or copper oxide type, or crystal detectors, or they may be diodes or other valves arranged to operate as rectifiers.

The circuit of Fig. 2 may be extended to detect faults which result in an abnormally high cathode current for the corresponding valves. Fig. 3 shows one way in which this may be done. In Fig. 3 the testing and adjusting arrangements have been omitted for clearness, and it is evident that they may be provided along the same lines as in Fig. 2.

Two detecting valves 16A and 16B are provided. The control grid of the valve 16A is connected to a common conductor 9A, which is connected to the anodes of rectifiers 7A, 8A, 10A ... etc. and 19A, whose cathodes are connected respectively to terminals 20 to 23. The control grid of the valve 16B is connected to a second common conductor 9B which is connected to the cathodes of rectifiers 7B, 8B, 10B ... etc. and 19B, whose anodes are connected respectively to terminals 20 to 23.

The cathodes of the valves 16A and 16B are connected to corresponding adjustable tapping points or a resistance 48 connected in series with a resistance 49 between the terminals 24 and 25. Resistance 48 corresponds to resistances 26 and 27 of Fig. 2, while resistance 49 corresponds to 28 and 29. The control grids of the valves are connected to the corresponding cathodes through resistances 31A and 31B.

The anodes of the valve 16A and 16B are connected to terminal 24 through the windings 32 and 34 of the relay 33, which should be poled so that the two anode currents act in opposition. Adjustable resistances 50 and 51 respectively shunt these windings.

The voltmeter 37 is provided as in Fig. 2, and has its negative terminal connected to ground, and its positive terminal to the switch 38 whose contacts are connected to terminals 20 to 23.

As in Fig. 2, the tapping points or the resistance 48 should be adjusted so that the potentials of the cathodes of the valves 16A and 16B have the specified reference value (5 volts). When all the test valves served by the alarm circuit are operating normally, the control grids of both the valves 16A and 16B will be substantially at cathode potential, and the resistances 50 and 51 should be adjusted so that the relay 33 is not operated.

If the cathode current in one of the test valves should fail, then the potential of the common conductor 9A will fall, and the anode current of the valve 16A will be reduced, as already explained with reference to Fig. 2. This will have no effect on the conductor 9B and valve 16B because the corresponding B rectifier will be blocked. On the other hand, if a fault occurs which abnormally increases the cathode current of one of the test valves, the potential of the common conductor 9B will rise, and the anode current of the valve 16B will be increased. No effect will be produced on the conductor 9A and valve 16A because the corresponding A rectifier will be blocked. It will be evident that since the windings of the relay 32 have been connected in opposition, both faults will tend to produce a similar effect on the relay. The resistances 50 and 51 should accordingly be adjusted so that either fault occurring alone will cause the relay to operate. It will be clear also that if both faults occur simultaneously in different test valves, the relay will also be operated. Thus either kind of fault will be signalled over the lines 36, though no information will be given as to the nature of the fault. This, however, is of little importance since in the case of an unattended station, it must be visited, and the fault can be located and diagnosed by means of the switch 38 and voltmeter 37 as explained with reference to Fig. 2. However, if desired, each of the valves could be provided with a separate relay arranged in the manner shown in Fig. 2, and this would enable separate signals to be given for the two kinds of fault.

As already mentioned, arrangements similar to those shown in Fig. 2 could be provided, if desired, for adjusting and checking the alarm circuit.

A number of other detecting arrangements will now be described which may be used instead of the valve 16 of Fig. 2, or instead of the valves 16A and 16B of Fig. 3. In all these arrangements the common conductor such as 9, 9A or 9B will be arranged together with the corresponding rectifiers in the manner as already described with reference to the preceding figures and will not again be illustrated in detail.

In Figs. 4 and 5, which show modifications of Fig. 1, a thermistor 52 of the indirectly heated type is used to detect the fault. In Fig. 4 the heating coil 53 of the thermistor is connected in series between the common conductor 9 and the resistance 15. The resistance element 54 is connected in series between a line 55 and the positive terminal of the source 14. When there is no fault, and the potential of the conductor 9 is substantially the same as that of the source 14, there will be practically no current through the heating coil of the thermistor, and it will be cold, and the resistance 54 will accordingly be high if the thermistor has a negative temperature coefficient, as is usually the case.

When a fault occurs, so that the potential of the conductor 9 becomes either abnormally high or abnormally low, a current of appreciable magnitude will flow through the heating coil 53, thus reducing the resistance 54. If a grounded relay (not shown) be connected to the distant end of the line 55, it may be operated by this current and so may be arranged to give a signal.

Fig. 5 shows an alternative arrangement in which the heating coil 53 of the thermistor 52 is connected in parallel with the common conductor 9, a suitable resistance 56 being included in series with the heating coil if necessary. In this case, there will be a current through the heating coil which depends upon the potential of the conductor 9, and on the occurrence of a fault, this current will increase or decrease, according to the nature of the fault. The resistance 54 will then decrease or increase accordingly and may be made to control the operation of a grounded relay (not shown) at the distant end of the conductor 55, thereby giving the desired signal.

It will be evident that if desired, the resistance element 54 in Fig. 4 or 5 may be connected to a source other than 14, and if two lines such as 55 are provided, the source may be at the distant end of these lines. A grounded source could evidently also be used at the distant end with only one line if one terminal of the resistance element 54 were connected to ground instead of to the source 14 in Fig. 4 or 5.

Thermistors suitable for use in these and other circuits to be described are disclosed in British patent specification Nos. 541,922, 555,563 and 557,559.

The thermistor 52 arranged as in Fig. 4 or 5 may be employed to give the signal in several other ways. In many cases it is preferable that the signal should be transmitted to the control station by high frequency alternating current instead of by direct current. The thermistor may accordingly be arranged directly to control an oscillation generator in such manner as to start or stop the oscillations when a fault occurs, without the use of any mechanical relays. Fig. 6 shows one such arrangement, in which a valve 57 has its cathode connected through a resistance 58 to the grounded negative terminal 59 of the high tension source. The anode is connected to the positive terminal 60 of the source through the primary winding of an output transformer 61, the usual by-pass condenser 62 being provided. The secondary winding of the transformer 61 is connected to output terminals 63 and 64.

The cathode is also connected through a blocking condenser 65 and through the resistance element 54 of the thermistor 52 to one terminal of the primary winding of a transformer 66, the other terminal of which is grounded. The secondary winding of the transformer 66 has one terminal grounded and the other terminal connected through a high resistance 67 to the control grid of the valve. The secondary winding is shunted by a tuning condenser 68.

The heating coil 53 of the thermistor may be connected to the alarm circuit in the manner shown in Fig. 4 for example.

There will be seen to be a cathode feedback connection between the cathode and control grid of the valve 57, and the transformer 66 should be poled so that the feedback is positive. In the absence of any fault, the thermistor will be practically cold and the resistance 54 will be very large, so that the amount of feedback will be insufficient to permit oscillations to take place. However, when a fault appears and the thermistor becomes heated, the resistance 54 falls, and it should be arranged so that when the potential of the common conductor 9 (Fig. 4) has reached the limiting value as a result of the fault, the resistance 54 is reduced sufficiently to permit oscillations to take place. The inductance of the secondary winding of the transformer 66 and the capacity of the condenser 68 should be so chosen that oscillations of a suitable frequency are produced. Either or both of these elements may be made variable, if desired. The terminals 63 and 64, from which the oscillations are obtained, may be connected to a suitable cable circuit or line for transmission to the control station where they may be applied to operate a signal device in any known way.

It will be noted that in Fig. 6, the thermistor 52 is connected in series with the feedback path. Alternatively it could be connected in shunt with this path. In this case, however, since it has a high resistance when cold, oscillations will take place under normal circumstances and the reduction in resistance 54 resulting from the fault will in this case cause the oscillations to stop. This may evidently be used to operate an appropriate signal device connected over a line to terminals 63 and 64.

The heating coil 53 of the thermistor may also be arranged in the manner indicated in Fig. 5. In this case, if the resistance element 54 is connected in series with the feedback path it may be arranged so that for faults of the kind causing a decrease in the potential of the common conductor 9, the circuit is normally oscillating, but is stopped when the fault occurs. For faults of the other kind, the oscillator will be arranged so as normally not to oscillate, the oscillations being started by the fault. When the resistance element 54 is connected in shunt with the feedback path, all these conditions will be reversed.

It is assumed that in Fig. 6 the resistance 58 provides, in addition to the desired amount of feedback, a potential for the cathode which produces a suitable control grid bias. If this is not the case, suitable control grid bias may be obtained in any convenient way, such as by connecting the lower end of the resistance 58, or the lower end of the secondary winding of the transformer 66, to a suitable tap on a resistance potentiometer connected between the terminals 59 and 60. Such conventional arrangements have not been shown in order to avoid complicating the figure.

Fig. 7 shows another method according to the invention by which one of the line amplifiers of the station may be employed to generate the fault signal oscillations which will be controlled by the thermistor. The frequency of these oscillations may be outside the frequency band occupied by the communication signals carried by the amplifier, and when this is so, it should preferably be near to this band. The amplifier is shown at 69 connected between the input line 70 and the output line 71. This amplifier may be of any conventional type and so no details are shown. The amplifier is provided with a feedback path connecting the output line 71 with the input line 70 and including a band pass filter 72 adapted to pass the fault signalling oscillations, but to exclude the communication signals. Following the filter 72 is a three-winding transformer 73 having two balanced secondary windings forming the ratio arms of a bridge, the other two arms of which are occupied respectively by the resistance element 54 of the thermistor 52 in series with an ordinary resistance 74, and by an amplitude controlling carbon resistance lamp 75, or other temperature dependent resistance. The junction point of the balanced windings of the transformer 73 is connected to one conductor of the input line 70 (which is preferably the grounded conductor if either is grounded), and the other diagonal point of the bridge is connected through a piezo-electric crystal 76 to the other conductor of the line 70. This crystal determines the frequency of the oscillations. The lamp 75 could have a tungsten or other metal filament instead of a carbon filament, in which case its position would be interchanged with that of the resistance 74.

The arrangement excluding the thermistor will be recognized as a well-known arrangement for obtaining oscillations of constant amplitude. The amount of feedback depends on the degree of balance of the bridge, and stabilisation is produced by the lamp 75 whose resistance varies with the current which flows therethrough. The principles of this arrangement are explained in detail in British patent specification No. 510,379.

When the thermistor is introduced, oscillations will take place when it is hot, in which case the resistance of the upper arm of the bridge is lower than that of the lower arm. When the carbon lamp 75 is heated by the oscillations its resistance falls and brings the bridge nearer to balance, and the resulting reduction in the feedback stabilizes the oscillations. When the thermistor is cooled, however, its resistance increases and brings the bridge still closer to balance, so that the oscillations are ultimately stopped. If the increase continues, the bridge becomes unbalanced in the opposite sense, the feedback is negative, and oscillations cannot take place. Thus oscillations occur when the thermistor is hot and are stopped when it is cold.

It will be clear from the explanations which have been given with reference to Figs. 4 and 5, that the connections of the heating coil 53 can be arranged so that the oscillations are either stopped or started when a fault occurs, whichever is desired, according as the fault has the effect of cooling or heating the thermistor.

In order that oscillations may occur substantially at the resonance frequency of the crystal 76 the phase change round the feedback loop should be substantially zero. Since the oscillation frequency should preferably be just outside the frequency band occupied by the communication signals, the phase change through the amplifier 69 will probably be considerably different from zero or 180°. It is desirable, therefore, to introduce some phase correcting means in the feedback path, such as a suitable condenser 77 shunting the primary winding of the transformer 73. Any other appropriate phase correcting device may, however, be used.

By a modification of Fig. 7, shown in Fig. 8, the controlling lamp 75 may be omitted, and the thermistor 52 may be transferred from the upper to the lower arm of the bridge. The thermistor should in this case be of the type which is appreciably heated by the current which flows through the resistance element 54 as well as by that which flows through the heating coil. The thermistor itself then acts to stabilise the oscillations by reducing its resistance on increase of the oscillation amplitude. It will be evident therefore that if further heating is provided by a current through the heating coil, the amplitude of the oscillations will be reduced and ultimately stopped, the feedback presently becoming negative. With this arrangement, therefore, oscillations occur when the thermistor is relatively cold and are stopped when it is relatively hot. The effects produced are therefore the reverse of those produced with the original arrangement of Fig. 7.

By still another modification of Fig. 7 shown in Fig. 9 the resistance element 54 of the thermistor may be connected outside the bridge in series with the conductor connecting one of the diagonal points of the bridge to the corresponding conductor of the line 70, instead of in series with the resistance 74. In this case oscillations will evidently be stopped when the thermistor is cold and started when it is hot, as in the original arrangement of Fig. 7.

The thermistor 52 may also be connected in shunt with the diagonal points of the bridge as indicated in Fig. 10. In this case it may be desirable to provide also a series resistance 78 outside the bridge. The oscillations will be started when the thermistor is cold and stopped when it is hot.

With all the modifications, shown in Figs. 8, 9 and 10, the crystal 76 may be either in the position shown in Fig. 7 or in the place of the filter 72.

It will be understood that in Figs. 7, 9 and 10 the controlling lamp 75 may be replaced by any other type of temperature-dependent resistance, such, for example, as a directly heated thermistor, and such other type of temperature dependent resistance will be interchanged into the resistance 74 if its resistance increases with increase of current.

The oscillator shown in Fig. 6 may be controlled according to the invention without the use of a thermistor. A suitable arrangement is shown in Fig. 11. This is similar in many respects to Fig. 6, but differs from it in the following particulars. A potentiometer 79 is connected in series with a variable resistance 80 across the high tension terminals 59 and 60. The cathode of the valve 57 is connected to the junction point of elements 79 and 80, and the resistance 80 is so adjusted that the valve is appropriately biassed. The lower terminal of the secondary winding of the transformer 66 is connected through a resistance 81 to the movable contact on the potentiometer 79, and also to ground through a by-pass condenser 82. The thermistor is omitted, and the common conductor 9 is connected to the upper end of the resistance 81. The source 14 of Fig. 1 is represented by the lower portion of the potentiometer 79, and the resistance 15 is represented by 81. The potentiometer 79 will be adjusted so that the specified reference voltage (5 volts) is applied to the conductor 9.

It will be evident that the control grid of the valve will be at a positive potential of about 5 volts when no fault is present. The cathode potential should be so adjusted by means of the resistance 80 so that the resulting effective grid bias is suitable for oscillations to take place.

On the occurrence of a fault of the kind which reduces the potential of the conductor 9, the oscillations may be arranged to be stopped by appropriate choice of the cathode potential. Alternatively, for a fault which increases the potential of the conductor 9, the cathode bias may be arranged so that no oscillations can take place under normal conditions, but they are started when a fault occurs. The manner in which the oscillations of an oscillator of this kind can be controlled by varying the control grid potential is more fully explained in the specification of co-pending application No. 24,042/44 or in British patent specification No. 545,866.

The common conductor 9 may alternatively be connected to the cathode of the valve 57 through a suitable resistance (not shown), in which case the operation of the circuit will be reversed.

It will be evident that testing arrangements on similar lines to those shown in Fig. 2, including the means for picking out the faulty valve, may be supplied for all the arrangements which have been described with reference to Figs. 1 and 4 to 11. It is to be understood also, that although all the valves have been shown as triodes for clearness, it will generally be preferable to use pentodes with the additional electrodes polarised in any suitable way.

In the arrangements described with reference to Figs. 2 and 3, a switch was provided to enable the defective valve to be picked out once the fault had been indicated. It is, however, possible to arrange for the faulty valve to be picked out automatically, and an individual indication to be given by means of a lamp or other suitable signal.

An arrangement of this kind is shown in Fig. 12. This figure is similar to Fig. 3 except that the switch 38 and voltmeter 37 have been omitted.

In Fig. 12, the operating magnets of relays are indicated by capital letters and the corresponding sets of contacts are indicated numerically. In the following description, the particular contacts under discussion will have their numerical designation preceded by a small letter indicative of the relay with which they are associated.

Fig. 12 includes a stepping switch of the automatic type having three banks of contacts, 83, 84 and 85 with cooperating wipers, all connected in tandem. Each bank has $n+2$ contacts numbered from 0 to $n+1$. The zero contact is the one on which the wiper rests when the wipers are in the home position.

The operating magnet of the switch is indicated by S and the interrupting contacts by $s$. When a defective valve causes the operation of the contacts 35 in the manner already explained, these contacts operate a starting relay X which locks itself up through the contacts $x1$ from ground connected to the wiper of the bank 84. It will be noticed that all the contacts of this bank are connected together excepting the last contact designated $n+1$.

The contacts 1 to $n$ of the bank 83 are connected to a number of storage relays, A, B, C . . . N having back contacts $a2$ . . . $n2$ connected respectively to the terminals 20, 21, 22, 23 etc. which are, in turn, connected to the cathodes of valves 1, 2, etc., in which valves a fault is to be detected as explained in connection with Fig. 1 hereof. These storage relays are all connected to battery through a key K and have locking windings connected through contacts $a1$, $b1$, $c1$ . . . $n1$ and indicating lamps L$a$, L$b$, L$c$ . . . L$n$ to ground. Contacts 0 and $n+1$ in banks 83 and 85 are not used.

The switch magnet S is operated indirectly by the contacts $y1$ of a slow operating relay Y, the operating time of which may be suitably adjusted by any convenient means (not shown).

The operation of the starting relay X disconnects the common conductors 9A and 9B respectively from the control grids of valves 16A and 16B by means of the changeover contacts $x2$ and $x3$, and connects the control grids of said valves to an additional pair of rectifiers 86A and 86B, the junction point of which is connected to the wiper of the bank 85. The various test points at terminals 20, 21, 22, 23 etc. are connected to corresponding contacts 1 to $n$ of the bank 85, through contacts $a2$, $b2$, $c2$ . . . $n2$ of relays A, B, C . . . N. The operation of relay X also starts the stopping of the switch $s$ by operating the contacts $x5$ which connect the relay Y to those contacts of the bank 84 which are all connected together, and thence through the wiper to ground. By means of the contacts $x4$, the starting relay also transfers the normally unconnected contact of the contact set 35 to the wiper of the bank 83. It will be seen that the switch will step around and will connect the terminals 20, 21, 22, and 23 etc. in turn to the control grids of valves 16A and 16B via contacts and the wiper of the bank 85, rectifiers 86A or 86B, front contacts $x2$ or $x3$; and when the terminal 22, for example, is reached, which is connected to a faulty valve, the contacts 35 will be operated as before, and will connect ground through the wiper of bank 83 to the corresponding storage relay C, which is thereupon operated and locks itself over its own contact $c1$, lighting at the same time the signal lamp L$c$. The operation of relay C also operates the changeover contacts $c2$, thereby disconnecting the terminal 22 from the junction point of the rectifiers 10A and 10B, and from the bank 85. At the same time these contacts connect to this junction point a direct current source 87 having a voltage equal to the specified reference voltage (5 volts). It will be clear, therefore, that the relay C gives the desired indication of the defective valve; and moreover, the test point having been disconnected, this defective valve ceases to have any further influence on the circuit.

The stepping switch continues to step until it reaches the last-but-one contact $n$. On taking the step to the last contact it will be seen that in the bank 84 the wiper disconnects the ground from the starting relay X and releases this relay. At the same time the magnet S is released but since the contacts $x5$ have been restored the magnet S will be energised once more and the switch will step to the home position corresponding to contact 0. Relay X having been released, the switch does not start moving again.

Should another fault be signalled the same operations take place and the defective valve is picked out as before. It will be noticed, however, that when the switch passes the position 3 corresponding to the terminal 22 there will be no effect because this terminal has been disconnected by the relay C in the manner described, and the source 87 of the standard voltage is substituted. When the step corresponding to another faulty relay is reached the corresponding storage relay will be operated and the lamp lit, and the terminal corresponding to this defective valve will be disconnected, as before.

When the operator has cleared the faults indicated by the lamps which have been lit, the storage relays may all be simultaneously released by the non-locking key K which momentarily disconnects the battery supply to these relays.

The contacts 0 and $n+1$ are preferably left blank in banks 83 and 85 in order to avoid any possibility of false operation of the arrangement. If, for example, storage relays were connected to these contacts in bank 83 and corresponding test points in bank 85, a fault on the $n+1$th test point would operate the contacts 35, and if these contacts and also the relay X (which would be operated thereby) do not release before the wipers have returned to the home zero contact, the switch will be restarted, and the storage relay connected to the zero contact will be operated, thus indicating a fault where none exists.

If, however, the operation of the switch S is made slow enough, by suitable adjustment or design of the relay Y, it may be possible safely to use the contacts 0 and $n+1$.

It is, of course, not essential to use the slow operating relay Y and it could be omitted if the switch magnet S were connected in place of it. In such case it would probably be essential to leave the contacts 0 and $n+1$ blank in the banks 83 and 85.

The wiper of the bank 84 of the switch S should preferably be of the bridging type, in order to prevent the accidental release of the relay X as the wiper moves from the contact to the next. The other wipers should preferably be of a non-bridging type, in order to avoid the risk of any false operation of the device 11, or of a storage relay, which might result from the momentary short-circuiting of two adjacent contacts.

What is claimed is:

1. An arrangement for indicating the presence of a fault associated with any one of a plurality of electric devices, comprising means for deriving a test potential characteristic of the operation of said devices from each of said devices, at least one test conductor connected common to said devices, a plurality of rectifiers each connected to a respective device and to said test conductor, means for applying said test potential to said common test conductor through said rectifiers, means for connecting to said test conductor a source of predetermined fixed potential in such manner that said conductor assumes a potential substantially equal to a predetermined limiting potential of said test potentials, said predetermined and test potentials being operative to block all of said rectifiers except that rectifier which corresponds to the device which produces said limiting test potential and means for connecting the test conductor to fault detecting means operative to transmit a fault indicating signal when the limiting test potential departs from the said fixed potential by more than a specified amount.

2. An arrangement according to claim 1 in which the fault detecting means comprises a thermionic valve having a relay connected in series with its anode circuit, the test conductor being connected to the control grid.

3. An arrangement for indicating the presence of a fault associated with any one of a plurality of thermionic valves, comprising means for deriving a test potential proportional to the space current of each valve, a plurality of rectifiers each connected to respective thermionic valves, a common test conductor connected to said rectifiers, means for connecting a source of predetermined fixed potential through a high resistance to the said conductor in such manner as to block said rectifiers for certain values of said test potential, said means for deriving said test potential being operative to release the rectifier of any particular thermionic valve when said space current of the valve deviates from a predetermined value and means for connecting the test conductor to a fault detecting device operative to transmit a fault indicating signal corresponding to the deviation of said space current.

4. An arrangement according to claim 3 in which the cathode of the said valve is connected to the said source of fixed potential, and also to the control grid of the valve through the said high resistance.

5. An arrangement for indicating the presence of a fault associated with any one of a plurality of thermionic valves, comprising means for deriving a test potential proportional to the space current of each valve, two test conductors common to all the said valves, means for applying the said test potential to the first of the test conductors through a corresponding one of a plurality of rectifiers all having their anodes connected to the first test conductor, means for applying the said test potential to the second test conductor through a corresponding one of the second plurality of rectifiers all having their cathodes connected to the second test conductor, means for connecting a source of predetermined fixed potential through a high resistance to each of the test conductors in such manner as to block all the rectifiers except those which correspond to the valves which produce the lowest and the highest test potential, respectively, and means for connecting each test conductor to fault detecting means, said last named means being operative to transmit a fault indicating signal when the said lowest and/or when the said highest test potential departs from the said fixed potential by more than a specified amount.

6. An arrangement according to claim 5 in which the test potential is derived from a resistance connected in series with the cathode of the valve.

7. An arrangement for indicating the presence of a fault associated with any one of a plurality of thermionic valves comprising means for deriving a test potential proportional to the space current of each valve, means for applying the said test potential to a common test conductor through a corresponding one of a plurality of rectifiers, means for connecting a source of predetermined fixed potential through a high resistance to said conductor in such manner as to block said rectifiers, said means for deriving said test potential being operative to release the rectifier of any particular thermionic valve when said space current of said valve deviates from a predetermined amount, means operable in response to said release for automatically giving an individual indication of the particular thermionic valve or valves affected, said means comprising an automatic stepping switch operative to commence the stepping operation in response to said deviation in space current.

8. An arrangement according to claim 7 comprising a plurality of storage relays corresponding respectively to the said electrical valves, and means for causing the switch to operate the storage relay corresponding to each valve which has failed.

9. An arrangement for indicating the presence of a fault associated with any one of a plurality of thermionic valves, comprising means for deriving a test potential proportional to the space current of each valve, test conductor means common to all of said valves, a plurality of rectifiers all having common electrodes connected to said conductor means, means for applying said test potential to said conductor means through said rectifiers, means for connecting a source of predetermined reference potential to said conductor means in such manner as to block all the rectifiers except those which operate at a predetermined variation from said reference potential and means coupled to said conductor means for signalling the operation of any valve at said predetermined variation.

BENT BULOW JACOBSEN.

REFERENCES CITED

The following references are of record in the file of this patent:

UNITED STATES PATENTS

| Number | Name | Date |
| --- | --- | --- |
| 1,786,805 | Wensley | Dec. 30, 1930 |
| 1,871,457 | Lomax | Aug. 16, 1932 |
| 2,057,531 | Livingston | Oct. 13, 1936 |
| 2,112,228 | Crago | Mar. 29, 1938 |
| 2,130,440 | Willis et al. | Sept. 20, 1938 |
| 2,377,506 | McWhirter et al. | June 5, 1945 |
| 2,444,421 | Boston | July 6, 1948 |
| 2,456,499 | Fritzinger | Dec. 14, 1948 |